United States Patent
Farkas et al.

(10) Patent No.: US 9,514,076 B2
(45) Date of Patent: Dec. 6, 2016

(54) OPTIMIZED TWO-SOCKET/FOUR-SOCKET SERVER ARCHITECTURE

(75) Inventors: Sandor T. Farkas, Round Rock, TX (US); Fernando Meschino, Round Rock, TX (US); Thomas Edwin Garvens, Austin, TX (US); Michael Jon Roberts, Austin, TX (US); Scott Michael Ramsey, Cedar Park, TX (US); Charles L. Haley, Belton, TX (US)

(73) Assignee: Dell Products L.P., Round Rock, TX (US)

( * ) Notice: Subject to any disclaimer, the term of this patent is extended or adjusted under 35 U.S.C. 154(b) by 1810 days.

(21) Appl. No.: 12/131,196

(22) Filed: Jun. 2, 2008

(65) Prior Publication Data

US 2009/0296359 A1 Dec. 3, 2009

(51) Int. Cl.
*H05K 7/10* (2006.01)
*G06F 13/38* (2006.01)

(52) U.S. Cl.
CPC .................................. *G06F 13/385* (2013.01)

(58) Field of Classification Search
CPC .................................................... G06F 13/385
USPC ........................................................ 361/785
See application file for complete search history.

(56) References Cited

U.S. PATENT DOCUMENTS

| | | | |
|---|---|---|---|
| 7,007,125 B2 | 2/2006 | Barker et al. | |
| 7,106,600 B2 * | 9/2006 | Kupla et al. | 361/783 |
| 7,124,410 B2 | 10/2006 | Berg et al. | |
| 7,512,731 B2 * | 3/2009 | Yang et al. | 710/311 |

* cited by examiner

*Primary Examiner* — William H Mayo, III
*Assistant Examiner* — Hiram E Gonzalez
(74) *Attorney, Agent, or Firm* — Terrile, Cannatti, Chambers & Holland, LLP; Stephen A. Terrile

(57) ABSTRACT

An information handling system is set forth which includes a fully connected 4S topology that can also be populated with two processors and two link modules (e.g., two passive "slugs") to implement a fully connected 2S topology. More specifically, the link module is a printed circuit board that implements a loopback connection between certain links of the architecture. In certain embodiment, the link module includes no electrical components. The link module merely includes a set of electrical connections (e.g., copper traces) connecting pads (e.g., gold plated pads) on a thick printed circuit board (PCB) dielectric material that is shaped to fit the processor socket. The link module is used to carry user data when the information handling system is configured in a 2S topology. The link module includes proper lane assignment that allows the module to be passive without performance reduction.

11 Claims, 13 Drawing Sheets

OPTIMIZED TWO-SOCKET/FOUR-SOCKET SERVER ARCHITECTURE

BACKGROUND OF THE INVENTION

Field of the Invention

The present invention relates to information handling systems and more particularly to an optimized two-socket/four-socket server architecture.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems are known which use a two socket (2S) server architecture. Information handling systems are also known which use a four socket (4S) server architecture. For example, referring to FIG. 1, a block diagram of an information handling system having a 4S topology using multi-processor (MP) type processors is shown.

FIG. 1B, labeled Prior Art, shows an example block diagram of an information handling system in which only the lower two sockets are populated with dual processor (DP) type processors. Leaving the upper sockets unpopulated is a valid bootable configuration, but can result in some unused connections (i.e., links) between sockets. Such a system has potentially reduced performance compared to a dedicated 2S design where all available connections are used.

FIG. 1C, labeled Prior Art, shows an example of a two socket topology with two direct connected links. In this topology, in addition to the link C connection, the link A and link B links of the processor are also connected. This topology thus provides a fully utilized lane assignment for a two socket topology. FIG. 1D, labeled Prior Art, shows an example of a four socket topology with two direct connected links. In this topology, in addition to the link C connection, the link A and link B links of the processor are also connected. This topology thus provides a fully utilized lane assignment for a four socket topology.

It is known to use loopback cables, connectors or modules (all generally referred to as loopback slugs) to provide connectivity for testing purposes.

It would be desirable to provide an information handling system design which could leverage design resources, cost, risk and time to market while providing a 2S/4S system. Challenges associated with providing such a system include cost of burden or unused components as well as potentially reduced performance compared to a dedicated 2S design due to missing connections.

SUMMARY OF THE INVENTION

In accordance with the present invention, an information handling system is set forth which includes a fully connected 4S topology that can also be populated with two processors and two link modules (e.g., two passive "slugs") to implement a fully connected 2S topology. More specifically, the link module is a printed circuit board that implements a loopback connection between certain links of the architecture. In certain embodiment, the link module includes no electrical components. The link module merely includes a set of electrical connections (e.g., copper traces) connecting pads (e.g., gold plated pads) on a thick printed circuit board (PCB) dielectric material that is shaped to fit the processor socket. The link module is used to carry user data when the information handling system is configured in a 2S topology. The link module includes proper lane assignment that allows the module to be passive without performance reduction due to signal integrity (SI) degradation.

More specifically, in one embodiment, the invention relates to a method for optimizing a four socket (4S) topology to function as a two socket (2S) topology within an information handling system. The method includes configuring an information handling system motherboard for a four-socket topology, providing two link modules wherein each link module comprises a loopback connection path, and inserting each of the two link modules into respective sockets of the information handling system motherboard so as to optimize the four socket topology to operate as a two socket topology.

In another embodiment, the invention relates to an optimized two socket/four socket (2S/4S) information handling system that includes a motherboard, first and second processors coupled to the two lower sockets, and a link module coupled to at least one of the two upper sockets. The motherboard comprises four processor sockets that are configured in a four-socket topology that has two lower sockets and two upper sockets. Included within the link module is a loopback connection path. The loopback connection path connects the upper socket to optimize the four-socket topology to operate as a two-socket topology.

BRIEF DESCRIPTION OF THE DRAWINGS

The present invention may be better understood, and its numerous objects, features, and advantages made apparent to those skilled in the art by referencing the accompanying drawings. The use of the same reference number throughout the several figures designates a like or similar element.

DETAILED DESCRIPTION

Figure 1A:
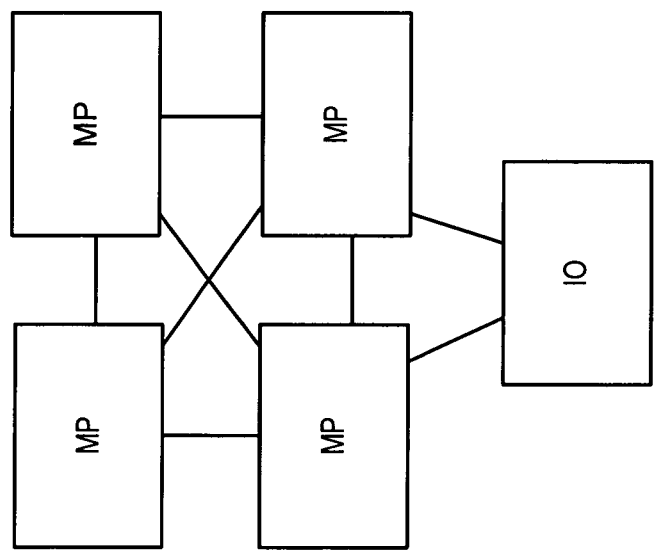
FIGS. 1A, 1B, 1C and 1D, collectively referred to herein as FIG. 1 and labeled Prior Art, show block diagrams of 4S and 2S topologies.
Figure 1B:
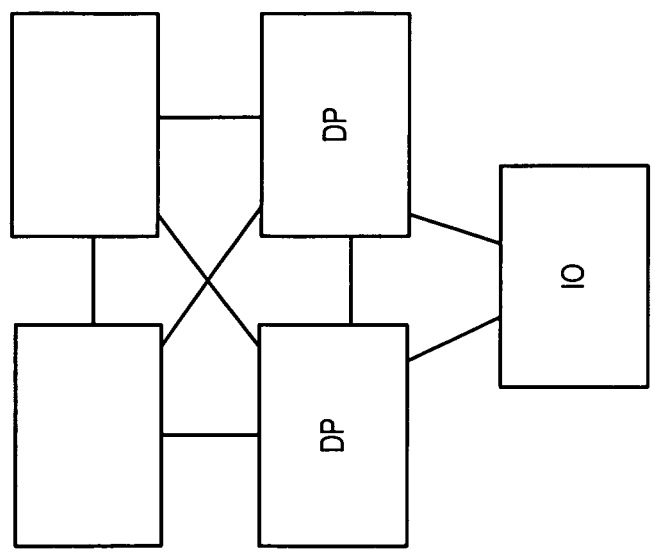
Figure 1C:
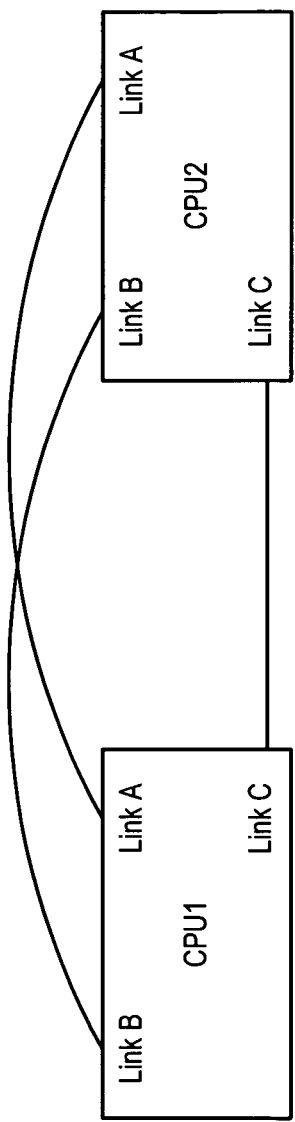
Figure 1D:
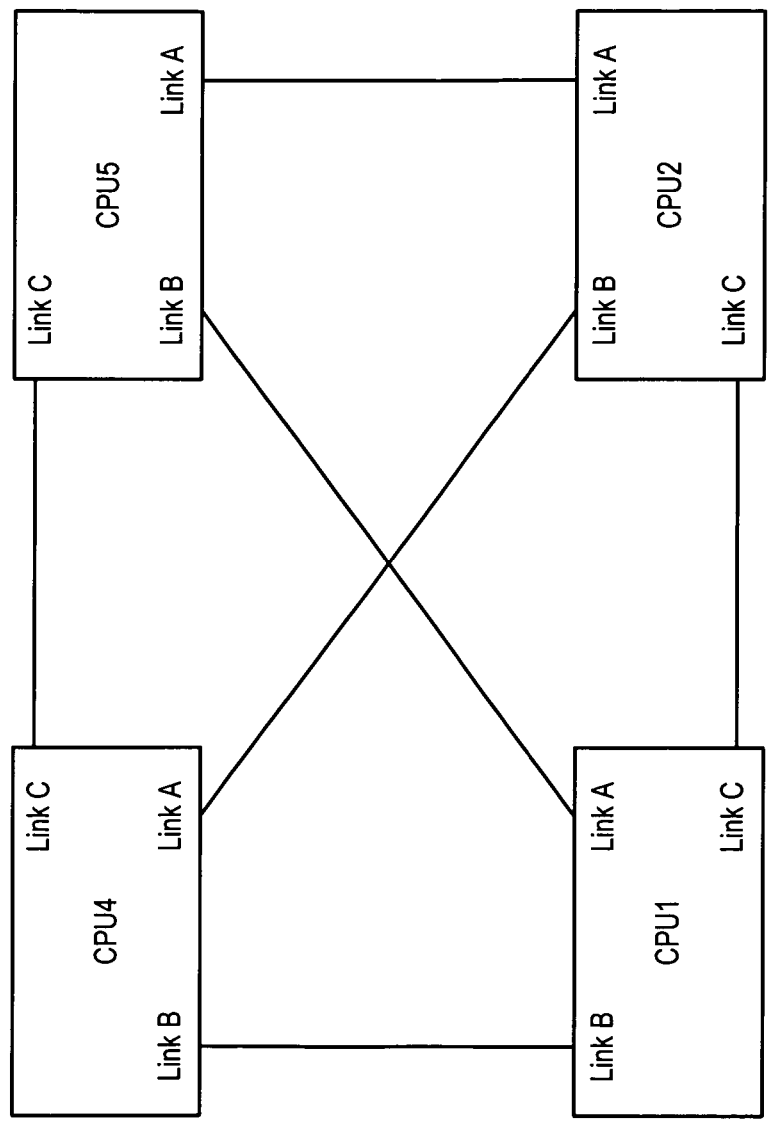
Figure 2:
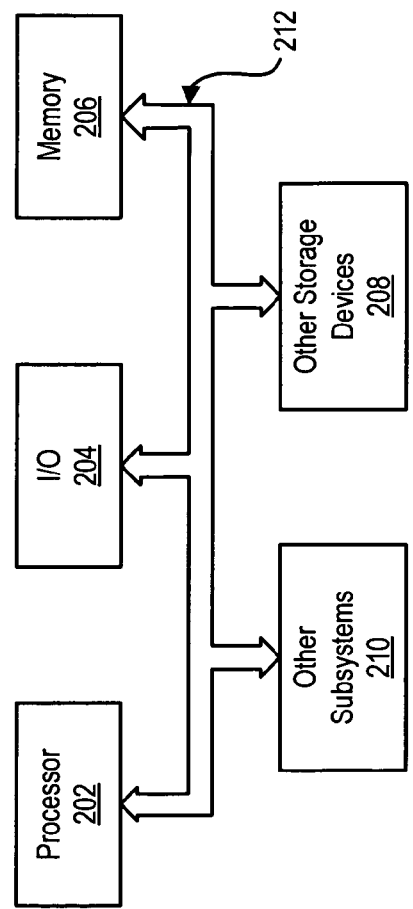
FIG. 2 shows a system block diagram of an information handling system in which an optimized 2S/4S topology may be implemented.

Referring briefly to FIG. 2, a system block diagram of an information handling system 200 in which an optimized 2S/4S topology may be implemented is shown. The information handling system 200 includes a processor 202, input/output (I/O) devices, such as a display, a keyboard, a mouse, and associated controllers, collectively designed by a reference numeral 204, a hard disk and drive 206, and other storage devices, such as a floppy disk and drive and other memory devices, collectively designated by a reference numeral 208, and various other subsystems, collectively designated by a reference numeral 210, all interconnected via one or more buses, shown collectively as a bus 212. The processor 202 and the memory 206 are configured to provide an optimized 2S/4S topology.

The information handling system can be configured as a fully connected 4S topology and can be configured as an optimized 2S topology that includes two processors and two link modules to implement a fully connected 2S topology.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 3:
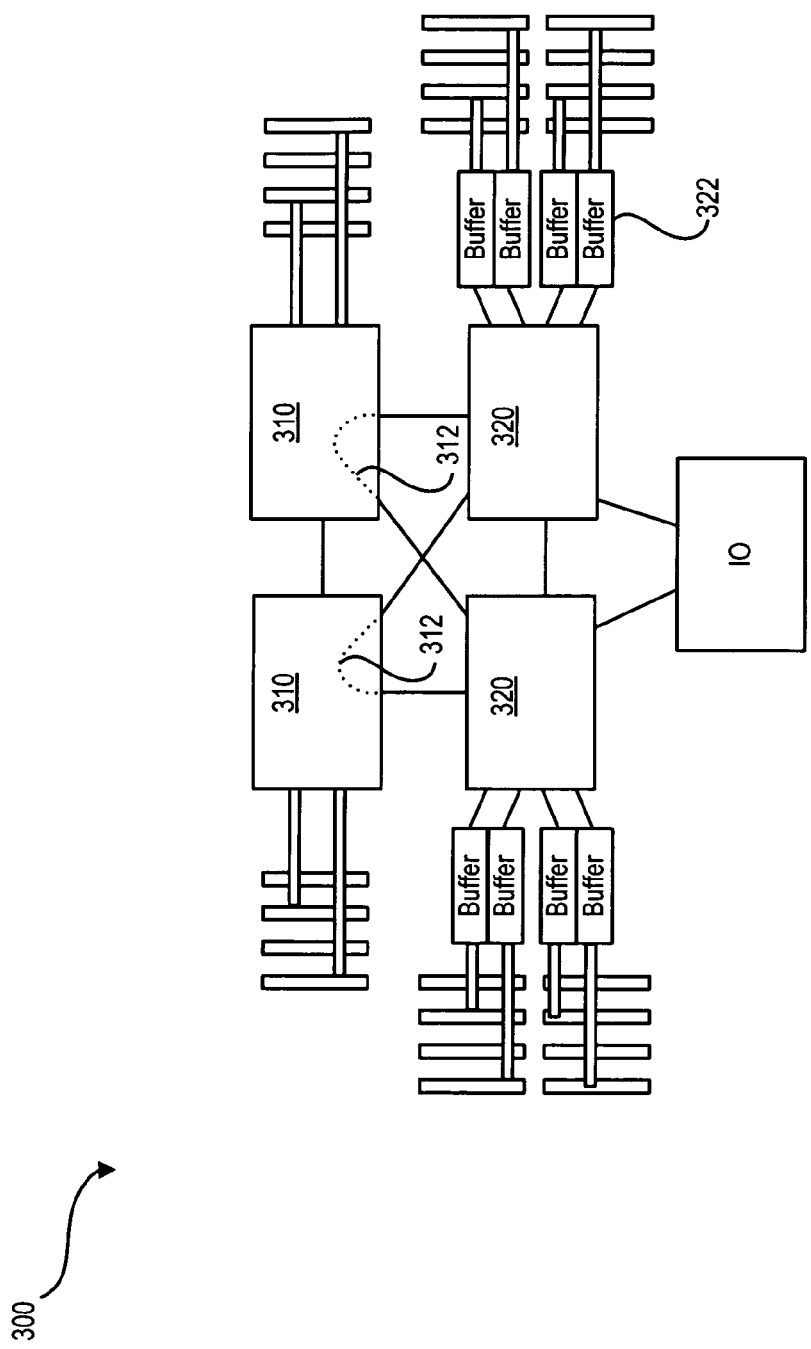
FIG. 3 shows a block diagram of an information handling system having an optimized 2S/4S topology.

Referring to FIG. 3, a block diagram of an information handling system having an optimized 2S/4S topology is shown. The information handling system 300 is configured as an optimized 2S topology that includes link modules 310. The link modules 310 include a loopback connection path 312. The link module 310 is a printed circuit board that implements loopback connections between certain links of the architecture. In certain embodiment, the link module includes no electrical components. The link module merely includes a set of electrical connections (e.g., copper traces) connecting pads (e.g., gold plated pads) on a printed circuit board (PCB) dielectric material that is shaped to fit the processor socket. In certain embodiments, the link module includes a 63 mil four layer board that includes two routing layers and two ground layers. The link module carries user data when the information handling system is configured in a 2S topology. The link module includes proper lane assignment that allows the module to be passive without performance reduction due to SI degradation.

Such an optimized 2S topology enables an optimized memory subsystem, such as an asymmetric memory system. In an asymmetric memory system, some of memory module sockets are directly connected to memory controllers while other memory module sockets are connected via buffers. Buffers allow more memory modules per memory controller without speed loss.

Within the optimized memory subsystem, a plurality of memory modules may be coupled to the processors 320 via buffers 322 while other memory modules may be directly connected to memory controllers. For example, in one embodiment 16 memory modules may be coupled to the processors via the buffers 322 while an additional 8 memory modules may be coupled to processors when processors are coupled to the upper sockets of the architecture. All 24 memory modules can execute at an optimized execution speed (e.g., at 1333 MHz) using a reduced number of buffers. However, when the link module 310 are coupled to the upper sockets, (i.e., the system is configured in an optimized 2S topology), no cost burden is added to the system due to unused buffers.

By using the optimized 2S/4S topology, the same motherboard design can accommodate both 4S and 2S architectures, where the architectures are user configurable. This has design leverage advantages, since resources and components can be shared.

Additionally, the information handling system 200 is bootable with one processor and without link modules. This allows minimum configurations for basic tests and link diagnostics.

Thus, by using the link modules 310, the information handling system provides optimized performance in both 4S and 2S modes of operation due to fully connected link topology and enables optimized (e.g., 1333) memory speeds.

Figure 4:
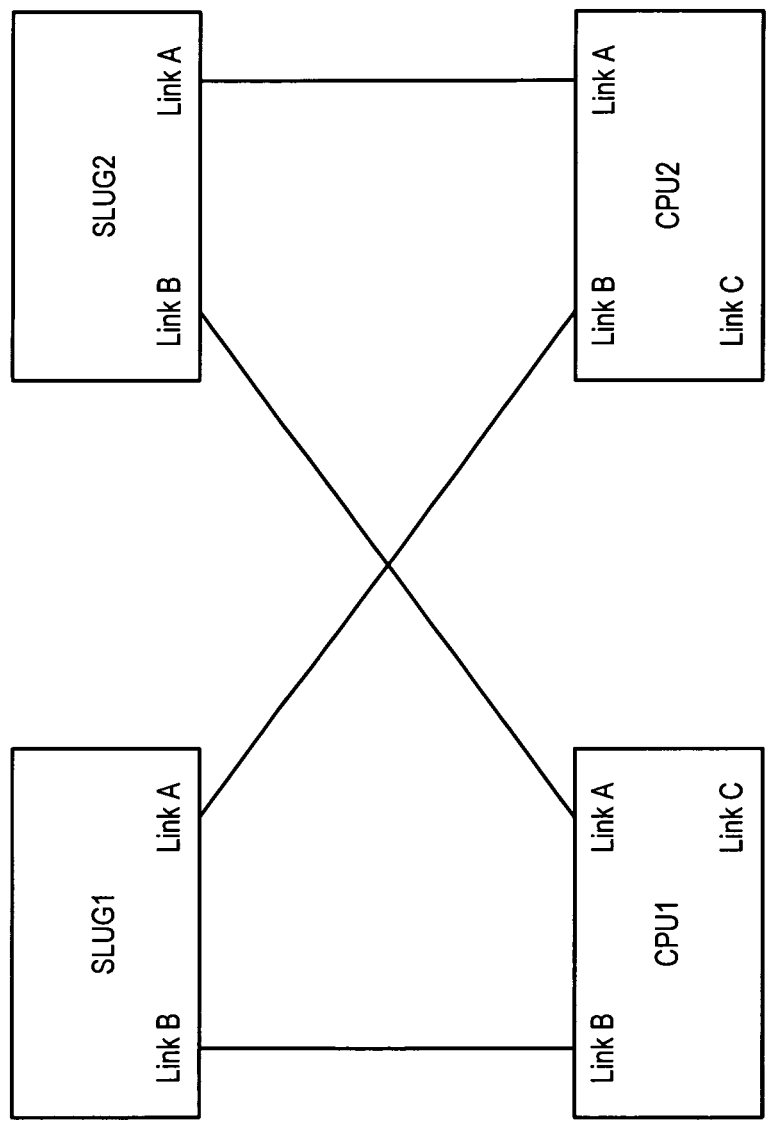
FIG. 4 shows a block diagram of an optimized two socket topology using two link modules.

Additionally, the link modules 310 are configured to enable a fully connected link topology. In certain embodiments, the link modules 310 are configured to optimize the links of the processors 320. For example, FIG. 4 shows a block diagram of an optimized two socket topology using two link modules to provide a fully connected two socket topology.

Figure 5:
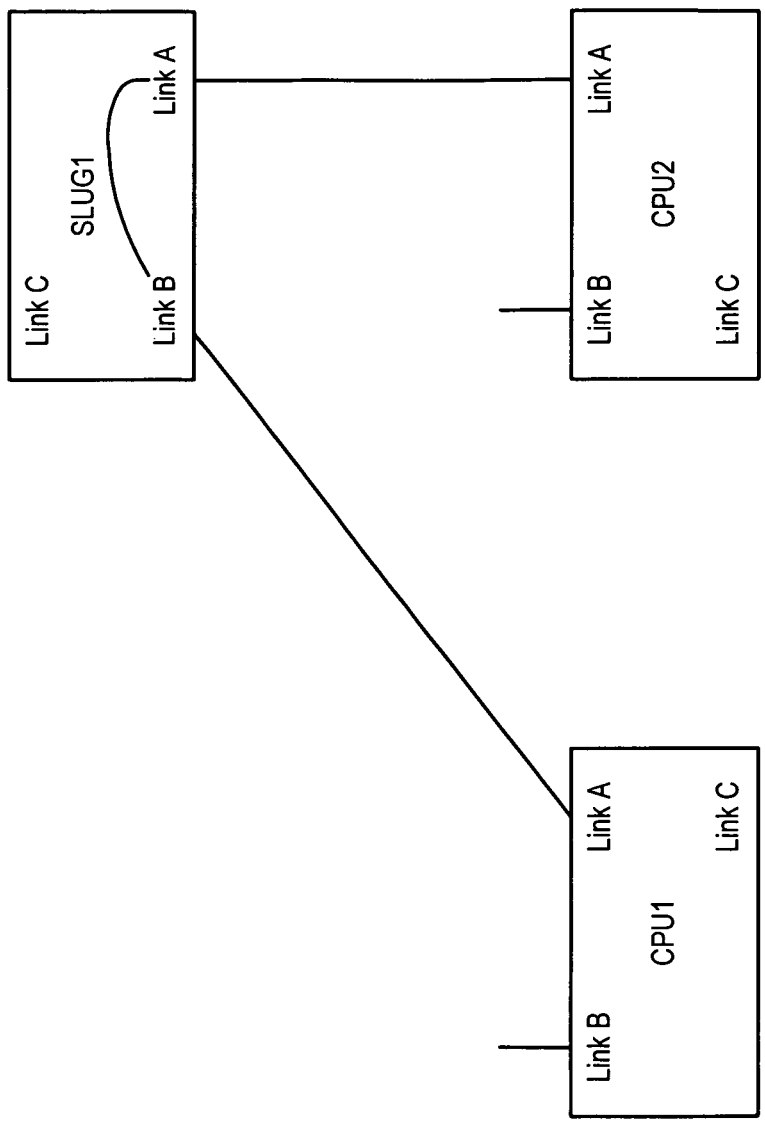
FIG. 5 shows a block diagram of an optimized socket topology using a single link module.

Such a topology also provides advantages even if only a single link module is included within the system. For example, FIG. 5 shows a block diagram of an optimized socket topology using a single link module.

Figure 6:
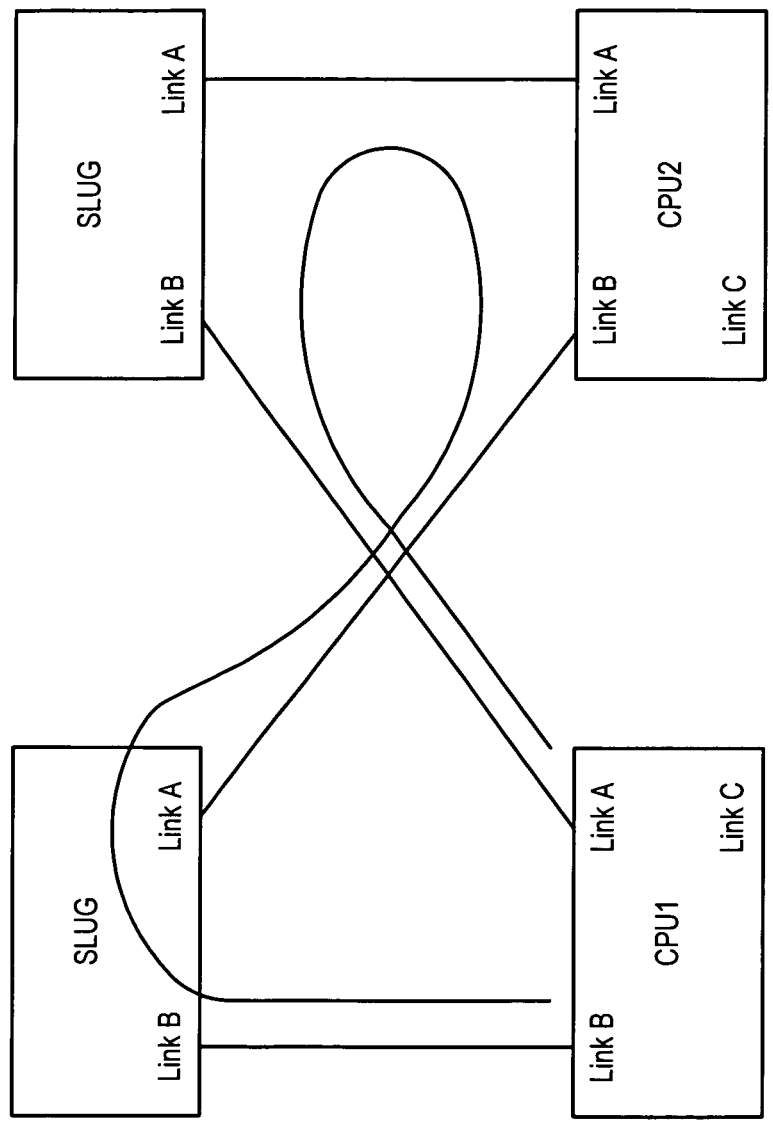
FIG. 6 shows a block diagram of an example test loop that is configured using the optimized 2S/4S topology.

Such a topology also provides advantages when performing in circuit tests on the system. For example, FIG. 6 shows a block diagram of an example test loop that is configured using the optimized 2S/4S topology. Thus, the same link modules can be used as loopback modules during in circuit testing (ICT) to provide basic processor socket coverage. This configuration allows closing a joint testing action group (JTAG) type test chain of the un-powered system through the link modules and could thus eliminate a need for capacitive opens test of the processor sockets.

Figure 7:
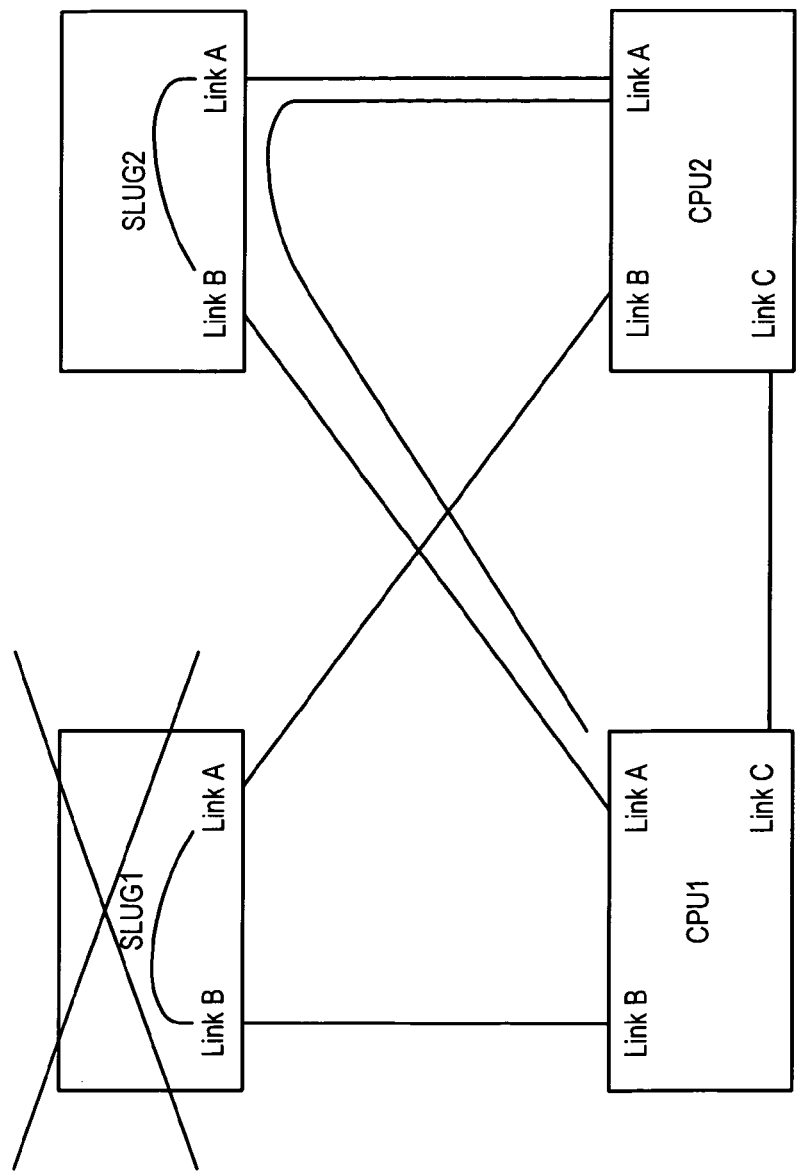
FIG. 7 shows an example of lane redundancy of an optimized two socket topology using two link modules.

Such a topology also provides advantages when is a connection with one of the link modules is corrupted. For example, FIG. 7 shows an example of lane redundancy of an optimized two socket topology using two link modules.

Figure 8:
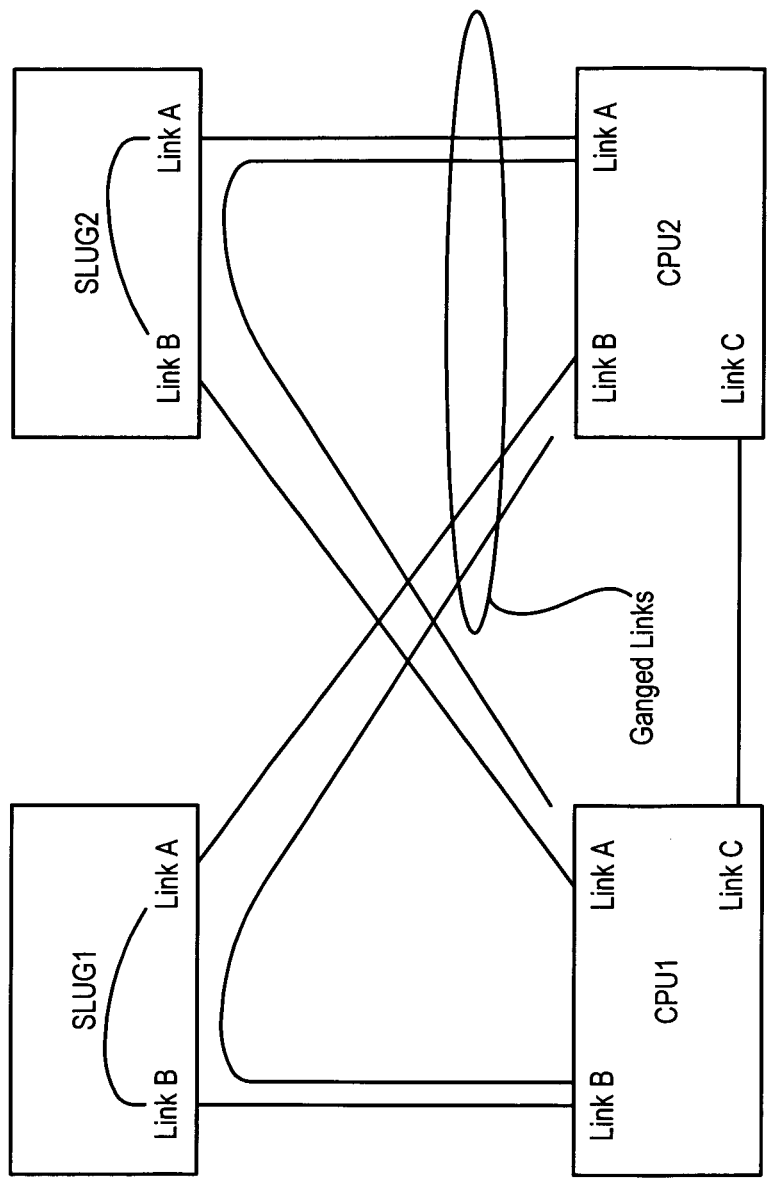
FIG. 8 shows an example of SI mitigation of an optimized two socket topology using two link modules.

Such a topology also provides advantages with respect to signal integrity mitigation by providing half speed/double wide links. For example, FIG. 8 shows an example of SI mitigation of an optimized two socket topology using two link modules. Thus, while in certain embodiments, the link modules are passive (thus providing a low cost solution), the link modules might require a potential speed reduction due to signal integrity (SI) over longer link distances of the loopback. Accordingly, a second link can be used to double the link width. Thus, the performance of the double wide half speed link is substantially identical to a half width full speed direct link.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

For example, while the links are shown for explanation, the actual link topology can vary depending on how many links each processor has and how those links are organized per processor core or integrated circuit die.

Figure 9:
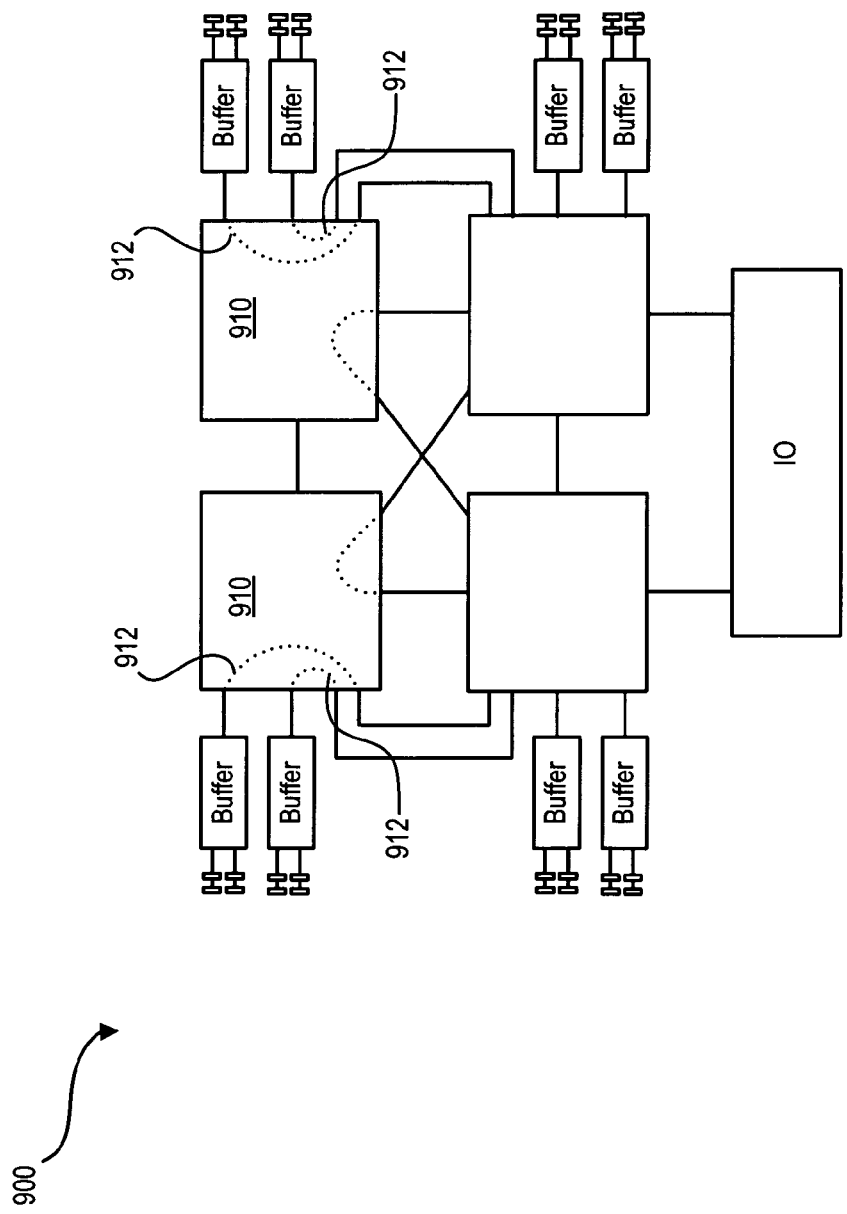
FIG. 9 shows a block diagram of an alternate optimized two socket topology using two link modules.

Also for example, other types of link modules may be used to provide memory optimization. For example, FIG. 9 shows a block diagram of an alternate optimized two socket topology using two link modules. With the alternate optimized two socket topology, the link modules include additional memory connection paths 912. The memory connection paths 912 enable the link module to provide previously unused links to the buffers that are associated with the processors slots 3 and 4. Without the memory connection paths, these buffers, and DIMMs would be inaccessible. For example, in one embodiment, this optimized two socket topology provides access to up to 32 DIMMs.

Figure 10:
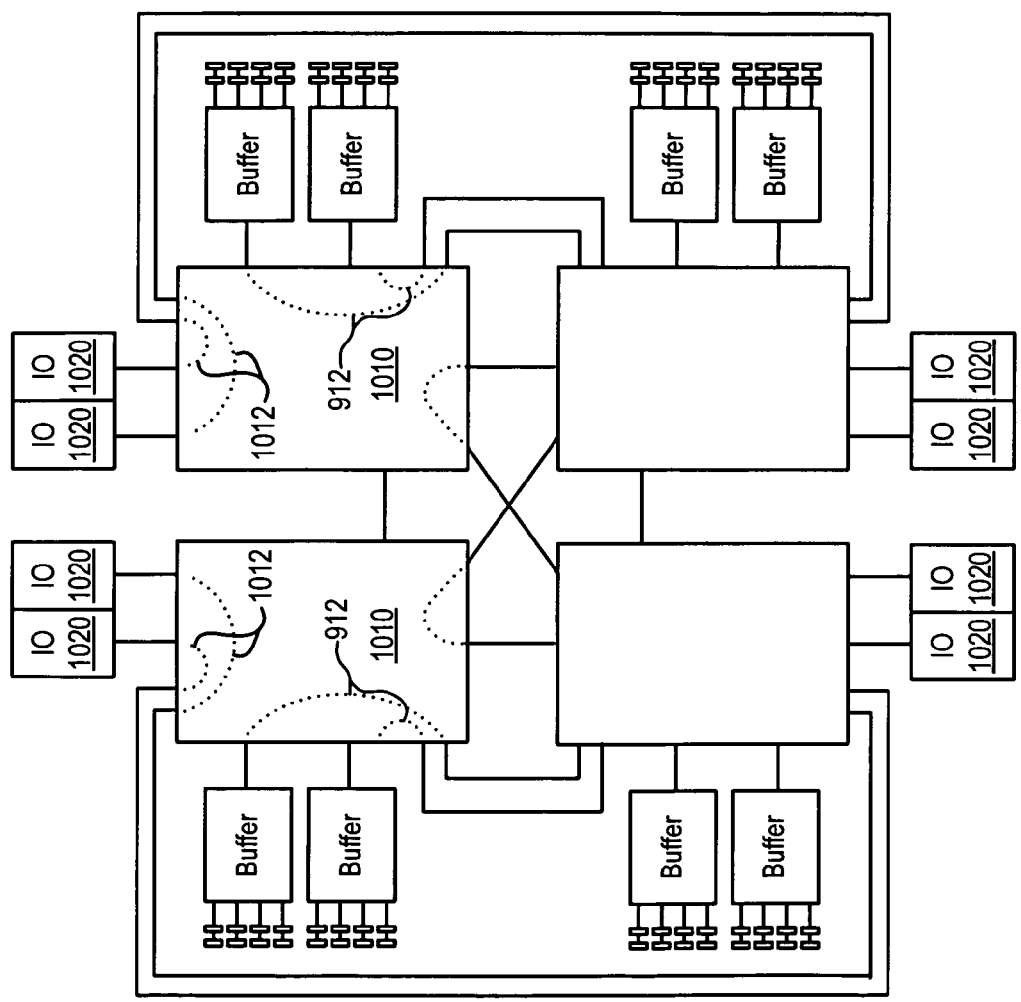
FIG. 10 shows a block diagram of another alternate optimized two socket topology using two link modules.

FIG. 10 shows a block diagram of another alternate optimized two socket topology using two link modules. With the alternate optimized two socket topology, the link modules include additional memory connection paths 912 as well as input/output (I/O) link connection paths 1012. The memory connection paths 912 enable the link module to provide previously unused links to the buffers that are associated with the processors slots 3 and 4. The I/O line connection paths 912 enable the link module to provide previously unused input output links of processors 1 and 2 to additional input output modules 1020.

Consequently, the invention is intended to be limited only by the spirit and scope of the appended claims, giving full cognizance to equivalents in all respects.

What is claimed is:

1. An optimized two socket/-four socket (2S/4S) information handling system comprising:
   a motherboard, the motherboard comprising four processor sockets, the four processor sockets being configured in a four socket topology, the four socket topology comprising two lower sockets and two upper sockets;
   first and second processors coupled to the two lower sockets; and,
   a first link module coupled to a first of the two upper sockets, the first link module comprising a loopback connection path, the loopback connection path connecting the first of the upper sockets so as to optimize the four socket topology to operate as a two socket topology; and,
   a second link module coupled to a second of the two upper sockets, the second link module comprising a loopback connection path, the loopback connection path connecting the second of the upper sockets so as to optimize the four socket topology to operate as a two socket topology; and wherein
   each of the first and second link modules comprises connections to provide a proper lane assignment for the first and second processors, the proper lane assignment allowing the first link module and the second link module to be passive without performance reduction due to signal integrity (SI) degradation.

2. The information handling system of claim 1 wherein, the first and second link modules are passive.

3. The information handling system of claim 1 wherein, each of the first and second link modules comprises a set of electrical connections and connecting pads on a printed circuit board (PCB) dielectric material that is shaped to fit the processor socket.

4. The information handling system of claim 1 wherein, each of the first and second link modules carries user data when the information handling system is configured in a 2S topology.

5. The information handling system of claim 1 wherein, the motherboard is configured such that the two lower sockets are coupled to memory buffers and the upper two sockets are directly coupled to memory sockets.

6. An apparatus for optimizing a four socket (4S) topology to function as a two socket (2S) topology within an information handling system comprising:
   an information handling system motherboard optimized for a four socket topology;
   two link modules, each link module comprising a loopback connection path, each of the two link modules being coupled to respective sockets of the information handling system motherboard so as to optimize the four socket topology to operate as a two socket topology; and wherein
   the two link modules each comprises connections to provide a proper lane assignment for the first and second processors, the proper lane assignment allowing the first link module and the second link module to be passive without performance reduction due to signal integrity (SI) degradation.

7. The apparatus of claim 6 wherein, each of the link modules are passive.

8. The apparatus of claim 6 wherein, each of the link modules comprise a set of electrical connections and connecting pads on a printed circuit board (PCB) dielectric material that is shaped to fit a respective processor socket.

9. The apparatus of claim 6 wherein, each of the link modules carries user data when the information handling system is configured in a 2S topology.

10. The apparatus of claim 6 wherein, the motherboard is configured such that the two lower sockets are coupled to memory buffers and the upper two sockets are directly coupled to memory sockets.

11. An optimized two socket/-four socket (2S/4S) information handling system comprising:
   a motherboard, the motherboard comprising four processor sockets, the four processor sockets being configured in a four socket topology, the four socket topology comprising two lower sockets and two upper sockets;
   first and second processors coupled to the two lower sockets; and,
   a first link module coupled to a first of the two upper sockets, the first link module comprising a loopback connection path, the loopback connection path connecting the first of the upper sockets so as to optimize the four socket topology to operate as a two socket topology; and, a second link module coupled to a second of the two upper sockets, the second link module comprising a loopback connection path, the loopback connection path connecting the second of the upper sockets so as to optimize the four socket topology to operate as a two socket topology; and wherein each of the first and second link modules comprises connections to provide a proper lane assignment for the first and second processors, the proper lane assignment allowing the first link module and the second link module to be passive without performance reduction due to signal integrity (SI) degradation; and wherein the first and second link modules are passive;

each of the first and second link modules comprises a set of electrical connections and connecting pads on a printed circuit board (PCB) dielectric material that is shaped to fit the processor socket;

each of the first and second link modules carries user data when the information handling system is configured in a 2S topology; and, the motherboard is configured such that the two lower sockets are coupled to memory buffers and the upper two sockets are directly coupled to memory sockets.

\* \* \* \* \*